(No Model.)
J. WAGNER.
SHAFT LOOP.
No. 302,452. Patented July 22, 1884.
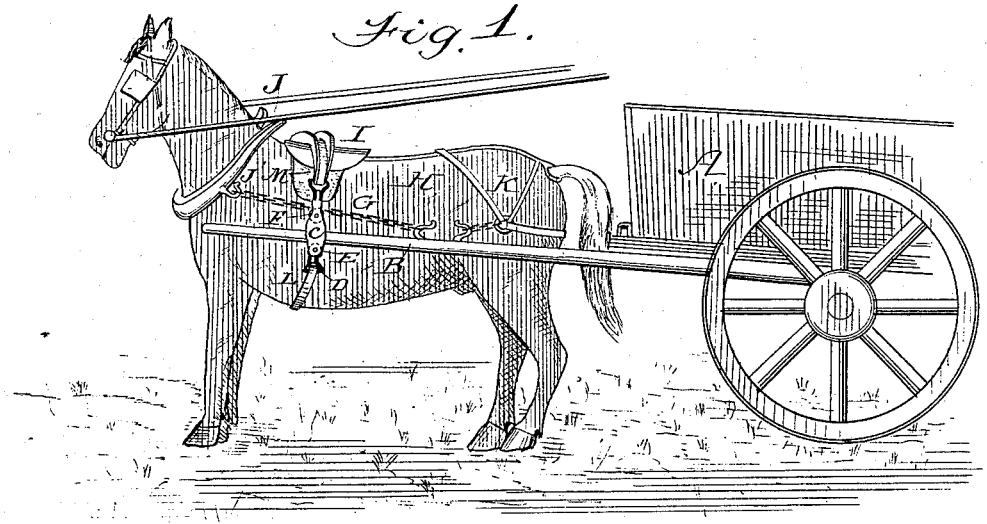
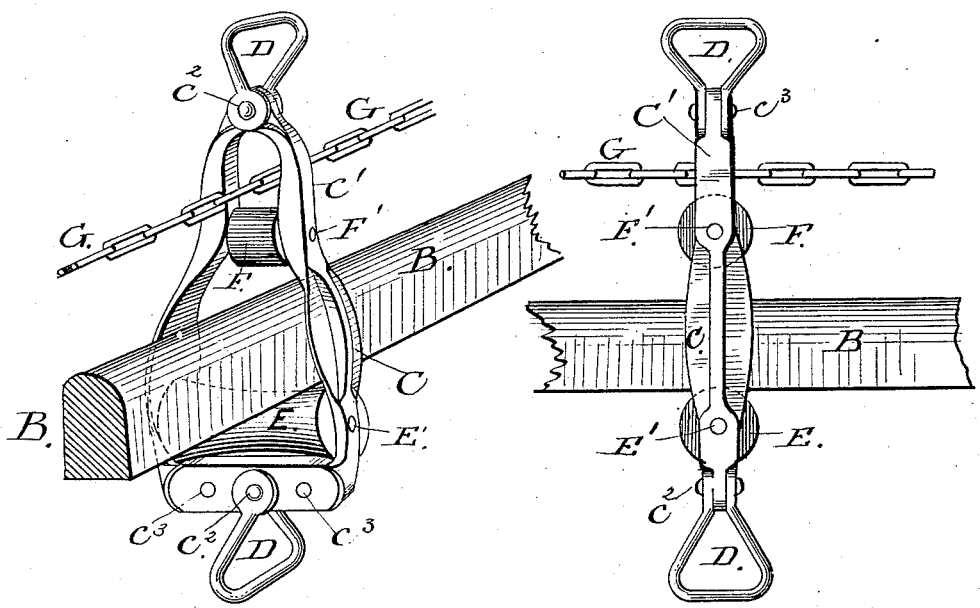
Attest:
S. Walter Fowler
H. B. Applewhaite
Inventor:
Julius Wagner,
by his atty
Thomas P. Kinsey

United States Patent Office.

JULIUS WAGNER, OF READING, PENNSYLVANIA.

SHAFT-LOOP.

SPECIFICATION forming part of Letters Patent No. 302,452, dated July 22, 1884.

Application filed April 28, 1884. (No model.)

*To all whom it may concern:*

Be it known that I, JULIUS WAGNER, a citizen of the United States, residing at the city of Reading, county of Berks, State of Pennsylvania, have invented a new and useful Improvement in Shaft-Loops, of which the following is a specification.

This invention pertains more particularly to shaft-loops for carts, drays, &c.

The object of the invention is to relieve the animal from the dragging action of the common loop and to support the trace or trace-chain in such a manner as will prevent it from rubbing the animal's skin. These objects are attained in the use of the invention shown in the drawings accompanying this specification, and forming a part thereof, in which similar letters of reference indicate corresponding parts throughout.

Figure 1 is a partial representation of a horse with the improvement attached to the harness upon the same. Fig. 2 is a perspective elevation of the shaft-loop detached from the harness. Fig. 3 is a front elevation of the same.

A frame, C, of the general form of loop shown, is formed of wrought-iron, steel, or suitable metal, has its edges broadened at C to give more wearing-surface to the loop, and its width between the legs in the lower portion such as to freely admit the shaft B of the cart A, while the upper portion of the loop is contracted at C', so as to just permit the chain or leather trace to pass free between the same.

D D are swivels, buckles, or fastenings of any suitable form, connected with the loop by pins $C^2$, fitting holes $C^3$ in the loop.

E is a roller, of iron, gum, leather, or equivalent material, of a uniform cylindrical shape, or of a concave form, as shown; E', the axis of the same; F, a straight, cylindrical, or concave roller, placed between the legs C', and mounted upon an axis, F', secured therein.

G represents the ordinary chain-trace common to cart and dray harness; H, the horse; I, the harness-saddle; J, the hames; J', the hames-hook for the trace; K, back-strap of harness; L, belly-band; M, saddle-band.

In lieu of the top roller, F, a brace may be cast or welded between the legs C', as a cheap substitute for the roller.

The frame of the loop may be partly or wholly covered with leather or other suitable material; but I find, practically, that, independent of mere appearance, the uncovered loop is as well adapted to service as the covered.

As usually hitched in carts or drays, the shaft is passed through the loop, which adheres with more or less force to the shaft as the weight of the load is thrown upon it, creating a strong friction between the contacting parts, and, owing to the want of slip between the surfaces, transmits all the jerks of the vehicle to the harness-saddle, and strains and worries the animal.

In my patent shaft-loop, No. 270,161, January 2, 1883, I have provided a remedy for the above action when applied to carriage-harness; but in cart and dray harness there is another cause of uneasiness and injury to the animal to combat, which is the swaying and frequent dropping of the trace-chains, occasioned by the sinuous movement of a cart or two-wheeled vehicle as the load is drawn forward over an ordinary rough road. It is not at all infrequent for the chain-traces to drop between the shaft and animal just as an obstruction is met, which throws the shaft with force against the chain, and presses the same in the skin of the animal. The upper roller, F, is designed to meet this difficulty, and is a complete practical cure for the same. The trace, instead of leading direct from the hames to the shaft draw-hook, is passed between the legs C' of the loop, resting upon the roller F. It is manifestly impossible for the chain-trace, as thus mounted, to drop between the shaft and animal, and consequently that source of danger is eliminated.

I am aware that complete metallic loops or shaft-tugs are not new, and that two rollers have been arranged in the same prior to my improvement, (see Patent No. 121,177, November 21, 1871, to Charles T. Lee, "Shaft-Tugs;") but in this case the upper roller was intended to take the friction of the shaft's movement in the loop, when from any cause the shaft would be lifted from the lower roller. My upper roller, which may be straight or concave upon its face, has sufficient space left above it, between the legs C', to pass the trace through, and the pull upon the trace brings it down upon the roller, and the roller, revolving or oscillating upon its axis, follows every movement of the trace, very materially assisting in equalizing the strains upon the animal and reducing the draft for a given load.

The loops or frames C may be cast or stamped in dies, of any suitable metal and of any convenient form to suit the character of shaft to be used therewith.

Having shown my invention and described its construction, use, and advantages, I desire to secure by Letters Patent the following claims thereon:

1. As an improved article of manufacture, a shaft-loop of metal in one continuous frame, adapted to cart or dray shafts, provided with a lower roller, E, to carry the shaft B, and an upper roller, F, to carry the trace of leather or chain, a passage being provided above the upper roller for the trace to pass through, in combination with the ordinary cart-harness, as and for the purpose set forth.

2. As an improved article of manufacture, a shaft-loop, in form as described, provided with suitable links, swivels, or buckles for connection with the ordinary cart-harness, having the frame broadened on a line with the shaft supported therein, the frame partially or wholly covered with leather, or its equivalent, having a shaft-roller, E, in the lower part of the frame, and a cross-bar or roller dividing the upper from the lower portion and forming a passage for the trace, substantially as and for the purpose set forth.

JULIUS WAGNER.

Witnesses:
F. PIERCE HUMMEL,
H. A. GOLDMAN.